Sept. 8, 1959     L. G. SIMJIAN     2,902,712
APPARATUS FOR TREATING FOOD
Filed June 21, 1957

LUTHER G. SIMJIAN
INVENTOR

BY *Ralph E. Bitner*
ATTORNEY

United States Patent Office 2,902,712
Patented Sept. 8, 1959

2,902,712
APPARATUS FOR TREATING FOOD

Luther G. Simjian, Greenwich, Conn., assignor to Reflectone Electronics, Inc., Stamford, Conn., a corporation of Connecticut Application June 21, 1957, Serial No. 667,081

4 Claims. (Cl. 17—25)

This invention relates to an apparatus for treating food to break up those portions which have a density which materially exceeds the density of other portions. The invention has particular reference to the treating of frozen meat to tenderize it and to break up the sinews and other dense portions within the meat body.

It is well-known that the toughness found in many cuts of meat is due to dense fibers which are present in the meat and which are not easily acted upon by the application of heat. It is also well-known that certain types of fruit such as grapefruit and oranges are somewhat indigestible because of numerous tough fibers which are always present in certain varieties of this fruit. Meat may be tenderized by excessive mechanical manipulation by pounding with a hammer or other blunt objects. This method is not entirely successful and has the disadvantage of distorting the meat and squeezing out many of the meat juices. The present invention employs mechanical movement derived from a vibrating gas column to break the tough fibers in the food while the food is in a rigid frozen state. Under these conditions the shape of the article is not changed and none of the juices are lost.

Throughout the specification and claims the term "coupling" is defined as any mechanical or fluid transmitting means which transfers vibrating energy from a resonant cavity to the frozen object.

One of the objects of this invention is to provide an improved apparatus for treating food which avoids one or more of the disadvantages and limitations of prior art arrangements.

Another object of the invention is to provide a structure for tenderizing food which is convenient and can be operated by inexperienced personnel.

Another object of the invention is to provide a food tenderizer which is operated by gas pressure, there being no mechanical parts requiring lubrication.

Another object of the invention is to tenderize food while in the frozen state, thereby eliminating the possibility of food spoilage.

One feature of the invention includes a means for generating acoustic energy in response to gas flow, this means being coupled to a cavity resonator which receives and reinforces the acoustic energy. The article is supported in communication with the resonator and receives acoustic energy from it.

Another feature of the invention includes an acoustic resonator having the frozen article of food as one of the walls thereof.

A third feature of the invention comprises a multiple applicator including a plurality of resonant chambers, each of these resonant chambers coupled to a frozen article of food by an acoustic transformer.

For a better understanding of the present invention together with other and further objects thereof, reference is made to the following description taken in connection with the accompanying drawings.

Figure 1:
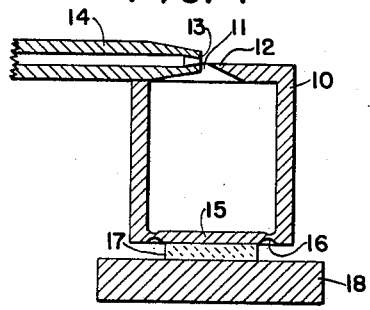
Fig. 1 is a cross sectional view of a cavity resonator with an article of food held against one of its walls.
Figure 2:
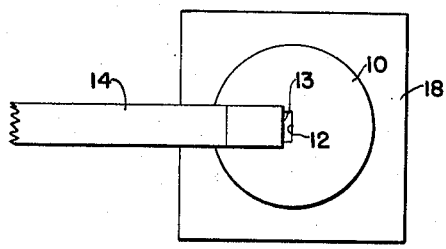
Fig. 2 is a top view of the resonator shown in Fig. 1.

Referring now to Figs. 1 and 2, a cavity resonator 10 includes an opening 11 with one side formed in the shape of a sharp edge 12. At the other side of the opening 11 is an orifice 13 comprising the end of a pipe 14 which is connected to a source of compressed gas. The resonator includes cylindrical side walls and a bottom portion 15 which may be formed with a constricted edge 16 in order to permit vertical vibration movement.

The article 17 to be frozen is placed in contact with bottom portion 15 as shown and the entire apparatus is supported by a heavy block of metal 18 which forms a base and has sufficient weight and inertia to restrict any vibrational movement which otherwise might be transmitted to it.

In order to tenderize the article of food 17 compressed gas, such as compressed air or steam under pressure, is forced through pipe 14 and, upon emerging and being split by edge 12, is broken into sound vibrations which travel into the resonant cavity 10 and, because of the reflection at portion 15, are reinforced and thereby produce a sustained acoustic wave of considerable intensity. The acoustic wave at opening 11 has substantially zero pressure but maximum amplitude, while the wave in contact with end portion 15 has maximum pressure but an amplitude which is restricted to the motion of the end portion. Since the end portion 15 is arranged for a small vibratory motion, the maximum pressure within the cavity will be translated into a small amount of vibratory motion and this energy will be communicated to the article of frozen food 17 and tenderize it by breaking up the portions of food which have the greater density.

Figure 3:
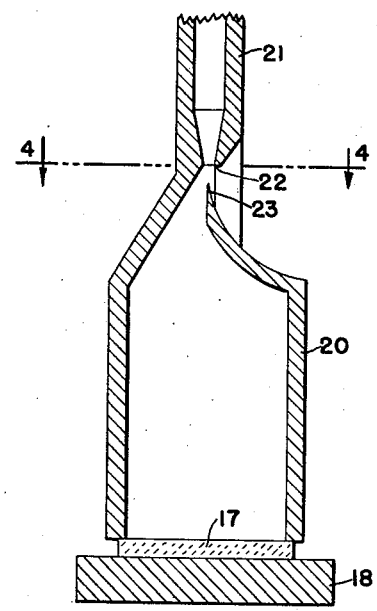
Fig. 3 is a cross sectional view of a cavity resonator with the article to be tenderized forming one of the walls of the resonator.
Figure 4:
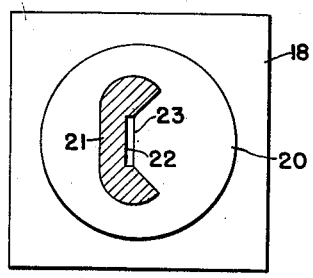
Fig. 4 is a cross sectional view of the resonator shown in Fig. 3 taken along line 4—4 of that figure.

Referring now to Figs. 3 and 4, a cavity resonator 20 is shown which is similar to the resonator in Figs. 1 and 2. This resonator is excited by a stream of compressed air which flows through pipe 21 and emerges at orifice 22 striking edge 23 which forms the vibrations to be reinforced by the resonant cavity. The action of the cavity formed by cylinder 20 is the same as that explained above in connection with cavity 10 but in this case the bottom portion of the cavity is formed by the article of food 17 which receives the reinforced sound waves at maximum pressure. As before, the article 17 is supported by a heavy metallic block 18.

Figure 5:
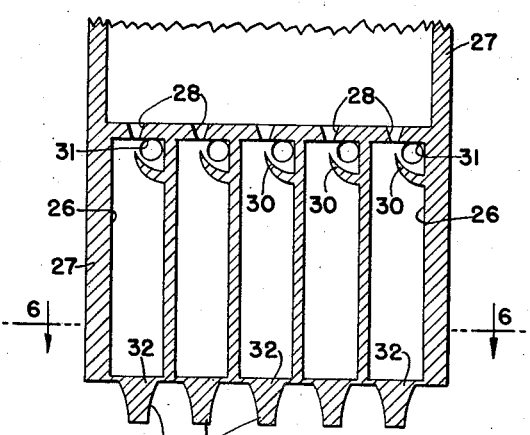
Fig. 5 is a cross sectional view of a multiple resonator, each of said resonators coupled to an acoustic transformer.
Figure 6:
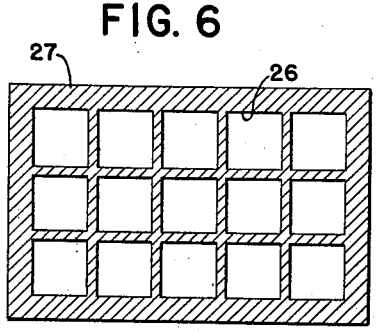
Fig. 6 is a cross sectional view of the apparatus shown in Fig. 5 taken along line 6—6 of that figure.

The apparatus shown in Figs. 5 and 6 comprises a series of many resonant cavities 26 formed in a unitary assembly and arranged to be actuated by a single conduit or pipe 27 which is connected to a source of compressed gas. The compressed gas flows through orifices 28 and is broken up in the usual manner by edges 30. The excess gas is admitted to the atmosphere by pipes 31. It has been found that multiple chambers arranged in this manner will generate vibratory acoustic energy having the same frequency and in the same phase, this vibratory energy exerting its maximum pressure at bottom portions 32 of the cavities. It should be understood that the bottom portions of this multiple resonator may be constructed in a manner similar to portion 15 in Fig. 1 or the bottom portions may be eliminated and the acoustic energy be applied directly to the article 17 as shown in Fig. 3. However, an alternate means of coupling is shown in Fig. 5 which includes acoustic transformers 33. These transformers are metallic cones which have an exterior base area considerably smaller than the area which is in communication with the resonant chamber 26. Because of the change in area, the cones 33 transmit an increased pressure to whatever article is placed against their lower ends, this apparatus thereby delivering considerably greater pressure to a smaller area.

The apparatus shown in Figs. 5 and 6 is applied to an article of food, the gas pressure is turned on, and after a predetermined time interval the article or the apparatus is shifted so that other areas may be treated. While this apparatus necessitates as many as four or nine application positions, it has the advantage of producing intense vibrational energy which may be necessary to completely break up dense portions in the article.

In the drawings only one form of sound generating device has been shown. It is well-known that a vibrating reed may be used in connection with resonant cavities to generate sound energy and such an alternate arrangement may be used in the structures described above.

While there have been described and illustrated specific embodiments of the apparatus it will be obvious that features of each embodiment may be combined with features of other embodiments to produce an efficient means for tenderizing food. The field of the invention should be limited only by the scope of the appended claims.

I claim:

1. An apparatus for treating a normally deformable article which has been rendered substantially rigid comprising: a resonator producing acoustic energy in response to gas flow, said resonator including an enclosure, a plurality of resonant chambers within said enclosure, each of said chambers having an orifice associated therewith, means associated with said orifices and chambers for feeding gas under pressure which causes the resonant chambers to acoustically vibrate, and means including a portion of said enclosure acting as a coupling means to transfer acoustic energy therefrom to the article which has been rendered substantially rigid.

2. An apparatus for treating a normally deformable article which has been rendered substantially rigid comprising: a resonator producing acoustic energy in response to gas flow, said resonator including an enclosure, a plurality of elongated resonant chambers within said enclosure, each of said chambers having an orifice associated therewith, means associated with said orifices and chambers for feeding gas under pressure which causes the resonant chambers to acoustically vibrate, and acoustic transformer means which form a portion of said enclosure acting as a coupling means to transfer acoustic energy therefrom to the article which has been rendered substantially rigid.

3. An apparatus for treating a normally deformable article which has been rendered substantially rigid comprising: a resonator producing acoustic energy in response to gas flow, said resonator including an enclosure, a plurality of parallel disposed resonant chambers within said enclosure, each of said chambers having an orifice associated therewith, means associated with said orifices and chambers for feeding gas under pressure which causes the resonant chambers to acoustically vibrate, a gas vent aperture associated with each chamber to permit excess gas to escape therefrom, and means including a portion of said enclosure acting as a coupling means to transfer acoustic energy therefrom to the article which has been rendered substantially rigid.

4. An apparatus for treating a normally deformable article which has been rendered substantially rigid comprising: a resonator producing acoustic energy in response to gas flow, said resonator including an enclosure, a plurality of resonant chambers within said enclosure, each of said chambers having an orifice and an edge associated therewith, means associated with said orifices and chambers for feeding gas under pressure through the orifices and across the edges to cause the resonant chambers to acoustically vibrate, means including a portion of said enclosure acting as a coupling means to transfer acoustic energy therefrom to the article which has been rendered substantially rigid, and said enclosure portion acting as a coupling means comprising articulate raised portions extending outwardly therefrom.

References Cited in the file of this patent

UNITED STATES PATENTS

| | | |
|---|---|---|
| 2,259,858 | Reid | Oct. 21, 1941 |
| 2,806,246 | Simjian | Sept. 17, 1957 |

FOREIGN PATENTS

| | | |
|---|---|---|
| 1,592 | Australia | July 28, 1931 |